US006762897B1

(12) United States Patent
Kabashima et al.

(10) Patent No.: US 6,762,897 B1
(45) Date of Patent: Jul. 13, 2004

(54) MAGNETIC ENCODER APPARATUS

(75) Inventors: Takefumi Kabashima, Kitakyushu (JP); Kazunari Matsuzaki, Kitakyushu (JP); Tomohiro Matsuo, Kitakyushu (JP); Tsuyoshi Asanuma, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 0 days.

(21) Appl. No.: 09/486,894

(22) PCT Filed: Sep. 8, 1998

(86) PCT No.: PCT/JP98/04016

§ 371 (c)(1),
(2), (4) Date: May 23, 2000

(87) PCT Pub. No.: WO99/13296

PCT Pub. Date: Mar. 18, 1999

(30) Foreign Application Priority Data

Sep. 8, 1997 (JP) ............................... 9-260955
Jan. 30, 1998 (JP) ............................... 10-34050
Jan. 30, 1998 (JP) ............................... 10-34051

(51) Int. Cl.$^7$ ..................................... G11B 15/18
(52) U.S. Cl. ..................................... 360/72.1
(58) Field of Search .................. 360/72.1; 324/173, 324/174, 207.17, 207.21; 318/602; 341/15

(56) References Cited

U.S. PATENT DOCUMENTS

| 4,274,053 A | * | 6/1981 | Ito et al. ..................... 324/174 |
| 4,319,188 A | * | 3/1982 | Ito et al. ..................... 324/173 |
| 4,851,752 A | * | 7/1989 | Nishimura et al. ......... 318/602 |
| 4,899,145 A | * | 2/1990 | Okuda et al. ................ 341/15 |
| 4,959,574 A | * | 9/1990 | Suzuki et al. ................ 310/91 |
| 4,983,916 A | * | 1/1991 | Iijima et al. ............. 324/207.21 |
| 5,081,756 A | * | 1/1992 | Abe et al. ..................... 29/593 |
| 5,325,056 A | * | 6/1994 | Shonowaki et al. ... 324/207.21 |
| 5,939,879 A | * | 8/1999 | Wingate et al. ........ 324/207.17 |
| 6,160,499 A | * | 12/2000 | Arinaga et al. ................ 341/15 |
| 6,259,249 B1 | * | 7/2001 | Miyata .................. 324/207.17 |

FOREIGN PATENT DOCUMENTS

| DE | 1 548 591 | 3/1970 |
| EP | 0 270 322 A2 A3 | 6/1988 |
| EP | 0 558 364 A1 | 9/1993 |
| EP | 0 726 448 A1 | 8/1996 |
| GB | 2 267 154 A | 11/1993 |
| JP | 57-112248 | 7/1982 |
| JP | 58-086405 | 5/1983 |
| JP | 58162813 | 9/1983 |
| JP | 58-162813 | 9/1983 |
| JP | 61-292503 | 12/1986 |
| JP | 62-237302 | 10/1987 |
| JP | 63-243718 | 10/1988 |
| JP | 05-333032 | 12/1993 |
| JP | 06-160011 | 6/1994 |
| JP | 6-62322 | 9/1994 |

* cited by examiner

Primary Examiner—David Hudspeth
Assistant Examiner—Fred F. Tzeng
(74) Attorney, Agent, or Firm—Morgan, Lewis & Bockius LLP

(57) ABSTRACT

A magnetic encoder apparatus comprises a permanent magnet 2 fixed to a rotating body 1, a magnetic field detection element 4 which is opposed to the permanent magnet 2 through an air gap and attached to a fixed body 3, and a signal processing circuit to process a signal from the magnetic field detection element 4. The permanent magnet 2 is formed into disk-like, and magnetized in one direction which is perpendicular to the shaft of the rotating body 1. The magnetic field detection element 4 is arranged on the outer peripheral side of the permanent magnet 2 through an air gap. Further, the fixed body 3 is formed by a ring-like magnetic substance, and an air gap is provided in the circumferential direction, and the magnetic field detection element may be provided in the air gap portion. Accordingly, a magnetic encoder apparatus in which the structure is simple, the resolution is very high, the accuracy is high, and the size is small, can be obtained.

7 Claims, 8 Drawing Sheets

ROTATION ANGLE POSITION (DEGREE)

MAGNETIC ENCODER APPARATUS

TECHNICAL FIELD

The present invention relates to a magnetic encoder apparatus to detect a rotation position of a rotating body.

BACKGROUND ART

Conventionally, a magnetic encoder apparatus to detect a rotation position of a rotating body is structured by, for example, as shown in FIG. 14, a magnetic drum 30 which is connected to a rotating body 10, and which has a recording medium 20 formed of magnetic coating or magnet material on its outer periphery, and a magnetic resistance element 40 which is opposed to the outer periphery through an air gap.

When an example of 4 bits is explained, the magnetic drum 30 is provided with a 4-track recording medium 20 arranged in the axial direction, and a signal of each bit ($2^0$, $2^1$, $2^2$, $2^3$) is formed by being magnetized to N and S poles at a constant pitch for each track.

Two magnetic resistance elements 40 are arranged for each track, and its interval is ½ pitch of a bit signal. By waveform shaping each bit signal, as shown in FIG. 15, each bit signal is outputted as signals of 4 kinds of rectangular waveforms in which one rotation of the rotating body 10 is equally divided, and the absolute position is detected by their synthetic signal.

Further, a magnetic encoder apparatus in which a disk magnet is fixed on the rotating body, and N and S poles are magnetized in the one direction on the upper surface of the magnet, and one magnetic sensor is provided opposed to the magnet, and by detecting the variation of the magnetic field by the magnetic sensor, the rotation position of the rotating body on which the magnet is fixed is detected, is disclosed (for example, JP-A-62-237302)

Further, a magnetic encoder apparatus in which, in order to make the variation of the magnetic field to be sinusoidal wave-like, an undulation is provided on the outer periphery of the rotating body, and a magnetic recording medium is formed along the shape of the undulation, is disclosed (for example, JP-A-58-162813, and JP-A-63-243718).

However, in the conventional technology shown in FIG. 14, there are following problems:
(1) Because the tracks to record each bit are arranged in the axial direction, when the number of bits is increased, the length in the axial direction becomes long, therefore, the size reduction is difficult.
(2) When the number of tracks is increased, the magnetizing portions are increased, therefore, the processing man-hour is increased.
(3) Because magnetic resistance elements are provided corresponding to each track, when the number of bits is increased, the number of wiring is increased, and the assembling working becomes complicated and the working man-hour is increased, and the cost is increased.

Further, in the conventional technology shown in the JP-A-62-237302, there are following problems:
(1) Because the magnetic sensor is one, the absolute position of the rotating body can not be obtained.
(2) Because the magnetic sensor detects the magnetic flux near the border line of the magnetic poles, the linear portion of the output waveform can be used, however, the accuracy of the sinusoidal waveform is lowered, and the detection accuracy of one rotation is lowered.

Further, in the conventional technology shown in the JP-A-63-243718, the undulation by which the magnetic field is changed in the sinusoidal waveform, is provided on the outer periphery of the rotating body, however, in a micro rotation detector to detect the rotation of, for example, a micro motor, because the outer shape of the rotating body is very small, it is very difficult to exactly process the outer shape of the rotating body to a sinusoidal wave-like concave and convex or an ellipse, and the rotation detector having the high detection accuracy can not be obtained.

Accordingly, an object of the present invention is to provide a magnetic encoder apparatus in which the structure is simple, the accuracy is high, and cost is low and the size is small, and the absolute position is obtained.

DISCLOSURE OF THE INVENTION

In the present invention, in a magnetic encoder apparatus, which has: a permanent magnet fixed to the rotating body; a magnetic field detection element which is opposed to the permanent magnet through an air gap, and fixed to the fixed body; and a signal processing circuit to process a signal from the magnetic field detection element, the permanent magnet is formed disk-like, and is magnetized in one direction which is the direction perpendicular to a shaft of the rotating body, and the magnetic field detection element is arranged on the outer periphery side of the permanent magnet through an air gap.

Further, the fixed body is formed of a ring-like magnetic substance, and has an air gap in the peripheral direction, and the magnetic field detection element is provided in the air gap.

Further, for the magnetic field detection element, two pairs of 2 magnetic field detection elements, which are one pair, are provided at positions whose phases are shifted by 180° from each other, wherein each pair of 2 magnetic field detection elements are formed such that their phases are different from each other by 90° electric angles, and the signal processing circuit is provided with a differential amplifier to process a differential signal between magnetic field detection elements which are opposed to each other, and detects the absolute value of a position of the rotating body.

Further, the magnetic field detection element is formed such that a radial magnetic sensing portion to detect a radial magnetic field to the axis of the rotating body and a circumferential magnetic sensing portion to detect a circumferential magnetic field to the axis of the rotating body are proximately arranged, and at least one magnetic field detection element is provided.

Further, for the magnetic field detection element, the Hall effect element or the magnetic resistance element is used. Further, the permanent magnet is formed of any one of a ferrite magnet, Sm—Co series magnet, Nd—Fe—B series magnet, or distributed composite magnet in which each kind of the magnets are combined with each other by the high polymer material, and the linearly anisotropic magnet may also be used.

According to such the means, the structure becomes simple, and because the rate of sinusoidal wave of the output signal from the magnetic field detection element is greatly increased, thereby, the position of the rotating body can be accurately detected.

BRIEF DESCRIPTION OF THE DRAWINGS

FIG. 9A is a perspective view, and FIG. 9B is an enlarged perspective view of the magnetic detection element.

BEST MODE FOR CARRYING OUT THE INVENTION

Next, according to the drawings, the present invention will be detailed.

THE FIRST EXAMPLE

Figure 1:
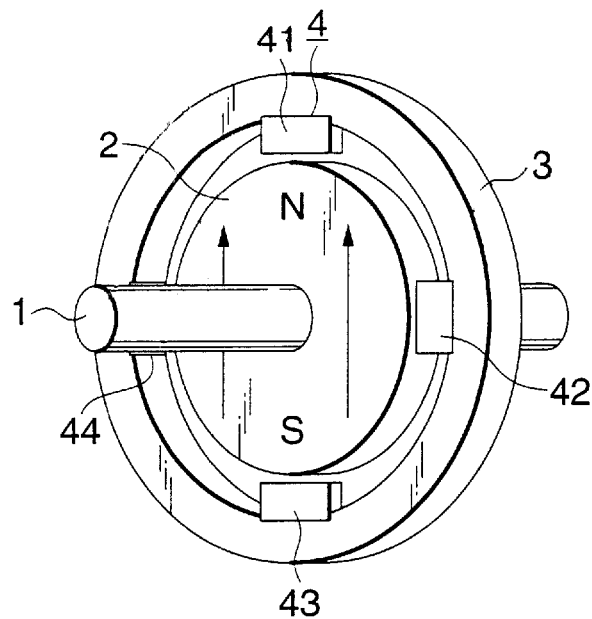
FIG. 1 is a perspective view showing a magnetic encoder apparatus of the first example of the present invention.

FIG. 1 is a perspective view of a magnetic encoder apparatus to detect the absolute position of a rotating body showing the first example of the present invention.

In the drawing, numeral 1 is a rotating body, numeral 2 is a hollowed disk-like permanent magnet fixed to the rotating body 1 so that their rotating shafts are the same as each other, numeral 3 is a ring-like fixed body provided on the outer periphery side of the permanent magnet 2, and numeral 4 is a magnetic field detection element.

The permanent magnet 3 is formed of, as the material, ferrite magnet, Sm—Co series magnet, Ne—Fe—B series magnet, or distributed composite magnet in which each kind of the magnets are combined with each other by the high polymer material, and is magnetized in the one direction in parallel to the vertical direction to the shaft of the rotating body on a flat surface portion, and has 2 poles of N and S. As the dimensions, the diameter is 3 mm, and the thickness is 1 mm.

A magnetic detection element 4 is formed of 4 Hall effect elements, and is provided such that the elements are opposed to the outer peripheral surface of the permanent magnet 2 through an air gap, and an $A_1$ phase detection element 41 and a $B_1$ phase detection element 42 are provided by shifting their phases by 90° electric angles to each other, and further, an $A_2$ phase detection element 43 is provided by shifting the phase by 180° electric angles to the $A_1$ phase detection element 41, and a $B_2$ phase detection element 44 is provided by shifting the phase by 180° electric angles to the $B_1$ phase detection element 42.

Figure 2:
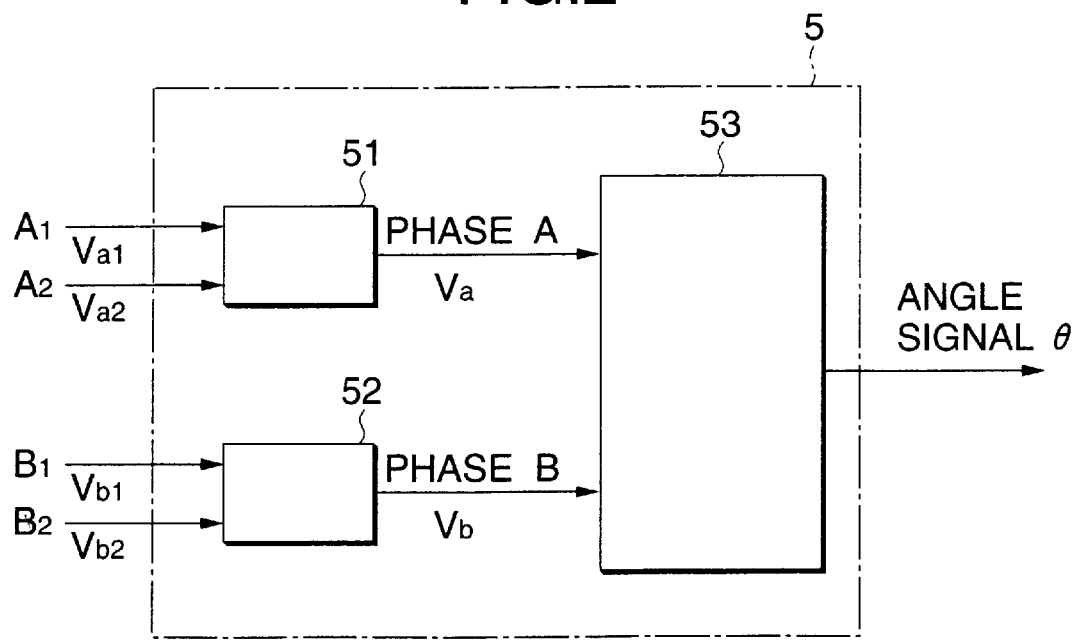
FIG. 2 is a block diagram showing a signal processing circuit of the first example of the present invention.

FIG. 2 is a circuit diagram showing a signal processing circuit 5 to process each of phase signals of $A_1$, $A_2$, $B_1$, and $B_2$ outputted from the magnetic field detection elements 4. The signal processing circuit 5 is provided with a differential amplifier 51 to output a differential signal $V_a$ of the $A_1$ phase and the $A_2$ phase, a differential amplifier 52 to output a differential signal $V_b$ of the $B_1$ phase and the $B_2$ phase, and an angle calculation circuit 53 to calculate a rotation angle by calculating arctan $(V_b/V_a)$ from the differential signals $V_a$ and $V_b$.

Figure 3:
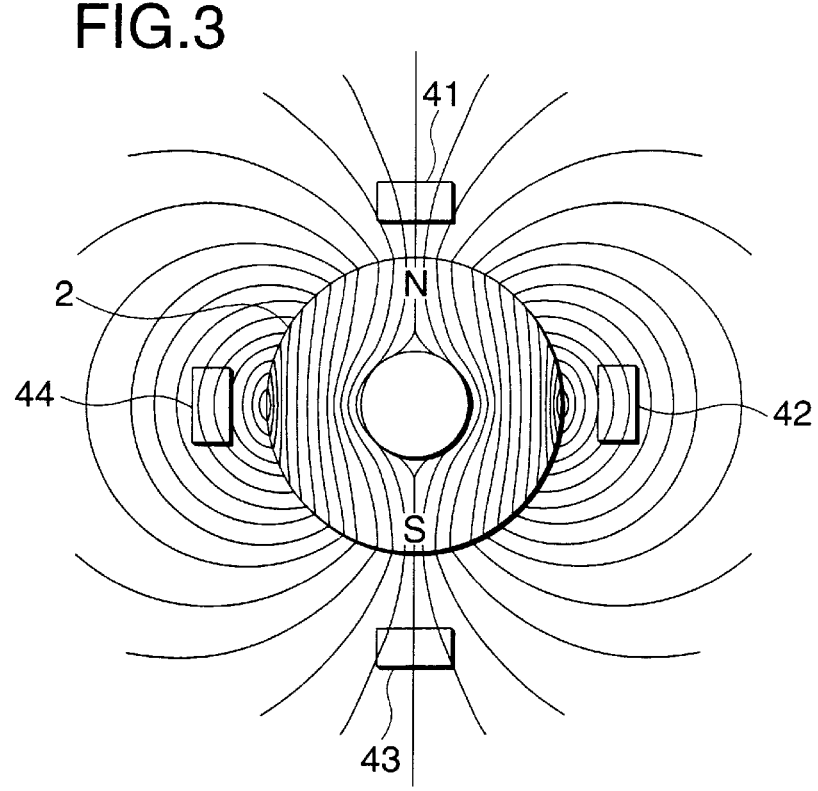
FIG. 3 is an illustration showing a distribution of the magnetic field of a permanent magnet of the first example of the present invention.

FIG. 3 is an illustration showing a distribution of the magnetic field of the permanent magnet 2.

Next, operations will be described.

Figure 4:
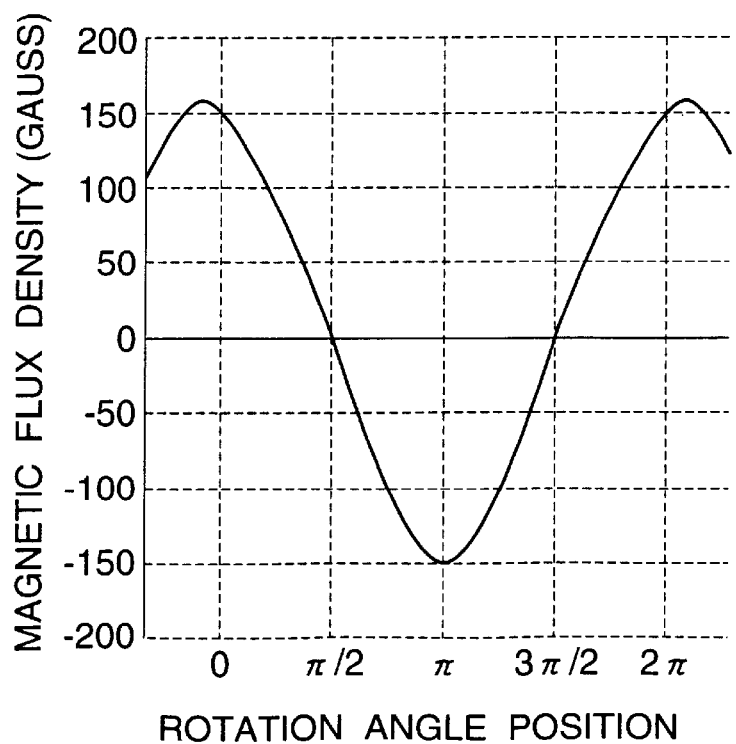
FIG. 4 is an illustration showing an output of one magnetic field detection element of the first example of the present invention.

When the rotating body 1 is rotated, one detection element detects the sinusoidal wave-like magnetic flux density corresponding to a rotation angle position as shown in FIG. 4. The magnetic flux is detected by each of phase detection elements 41, 42, 43 and 44 of the magnetic field detection element 4, and signals A1, B1, A2 and B2 of each phase are outputted. This signal output is processed by the signal processing circuit shown in FIG. 2.

Figure 5:
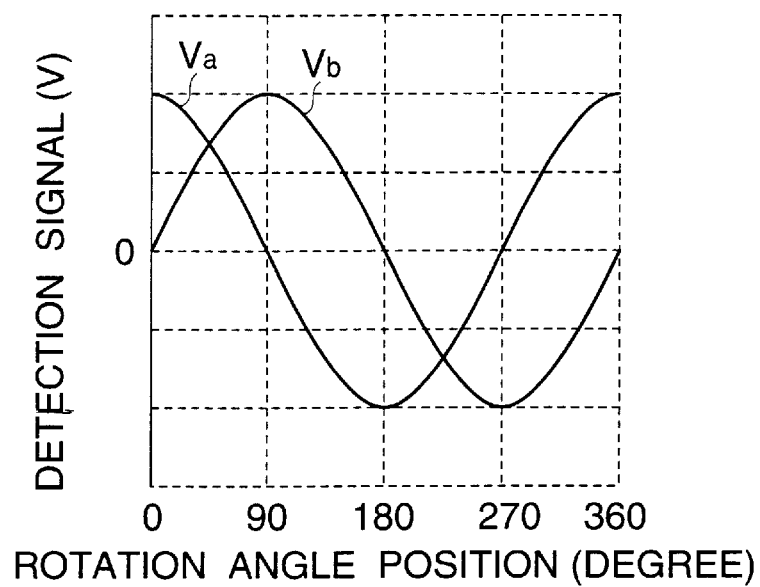
FIG. 5 is an illustration showing an output of the signal processing circuit of the first example of the present invention.

When the rotating body 1 is eccentrically rotated, the detected waveform of the magnetic flux density is displaced corresponding to an eccentric amount. However, because, for the A and B phases, the difference between the A1 phase and A2 phase, and between B1 phase and B2 phase, whose phases are shifted by 180° from each other, is processed, thereby, the eccentric amount is cancelled, and two sinusoidal waves whose phases are shifted by 90° from each other, as shown in FIG. 5, that is, when the rotation angle is θ, the waveforms of sin θ and cos θ are obtained.

Accordingly, by an angle calculation circuit 53 whose inputs are the A and B phases, an operation of θ=arctan $(V_b/V_a)$ is conducted, and the rotation angle of the absolute position is detected.

As described above, because the disk-like permanent magnet 2 is magnetized in the one direction along a flat surface portion, and four magnetic field detection elements 4 which are opposed to the outer peripheral surface of the permanent magnet 2 are provided, each magnetic field detection element 4 can detect the accurate sinusoidal wave signal.

When the absolute position of one rotation is detected, the absolute position signal in which one rotation is divided by 32000, can be obtained, and the greatly high resolution can be obtained.

Incidentally, when the eccentric amount of the rotating body 1 is very small, the magnetic field detection element 4 may be structured such that the detection signal of the waveforms of sin θ and cos θ is obtained by 2 detection elements of the A phase detection element and B phase detection element which are fixed in the circumferential direction with an interval of 90°.

Further, in this manner, when 2 detection elements of the A phase detection element and B phase detection element are provided, the rotation detection and incremental position of the rotating body 1 can be detected, however, when it is not necessary to obtain the rotation direction, the sinusoidal wave signal may be obtained by one detection element.

Further, in the above example, an example in which the Hall effect element is used as the magnetic field detection element, is described, however, the same effect can also be obtained when the magnetic resistance element is used.

Further, in the above example, an example in which the hollowed disk-like permanent magnet 2 is used, is explained, however, even when the permanent magnet 2 is formed solid disk-like, the same effect can be obtained.

Further, the permanent magnet may be structured by the linearly anisotropic magnet which is easily magnetized in the one direction, and the magnetizing efficiency may be increased.

Further, by forming the fixed body 3 by a magnetic substance, the output of detection signal is increased, and higher harmonic wave components are reduced and magnetic noises from the outside are reduced, and thereby, an S/N ratio may be increased.

THE SECOND EXAMPLE

Figure 6:
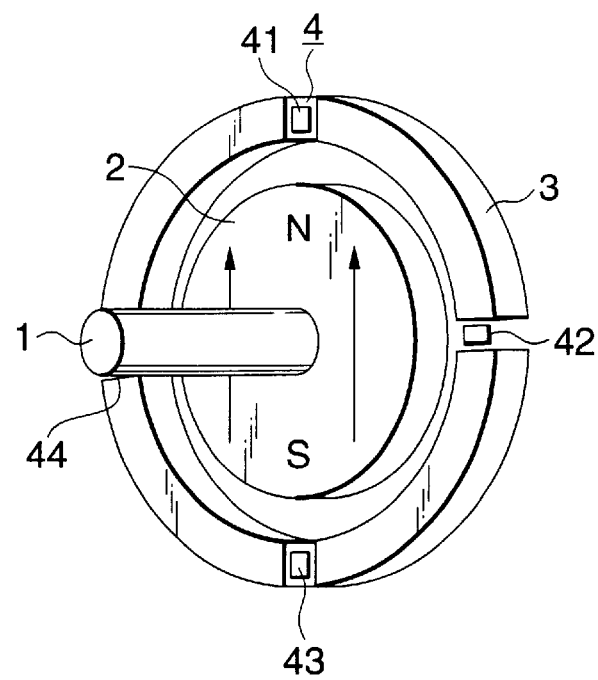
FIG. 6 is a perspective view showing a magnetic encoder apparatus of the second example of the present invention.

FIG. 6 is a perspective view of a magnetic encoder apparatus showing the second example of the present invention.

In the present example, a ring-like fixed body 3 is divided into 4 portions in the circumferential direction, and the magnetic field detection elements 4 are arranged in the air gaps. Other structures and the angle detection method are the same as in the first example. The fixed body 3 is structured such that iron which is a ring-like magnetic substance, is equally divided into 4 portions and 4 air gaps are formed. The magnetic field detection elements 4 are arranged in the air gap portions, and in the same manner as the first example, attached in the circumferential direction with an interval of 90°. The outer diameter of the fixed body 3 is 5 mm. The permanent magnet 2 is a disk-like member of a 3 mm diameter and 1 mm thickness, and fixed by adhesion on the end surface of the rotation shaft of the rotating body 1. As the magnetic field detection element 4, the magnetic resistance element is used.

Incidentally, in the present example, iron is used as the magnetic substance of the fixed body 3, however, the present invention is not limited to this, but, any material such as permalloy or ferrite may be used when the material is the magnetic substance. Further, the permanent magnet 2 is fixed by adhesion in the end surface of the rotation shaft of the rotating body 1, however, the structure in which the rotation shaft is penetrated through the permanent magnet 2, may also be allowable.

Figure 7:
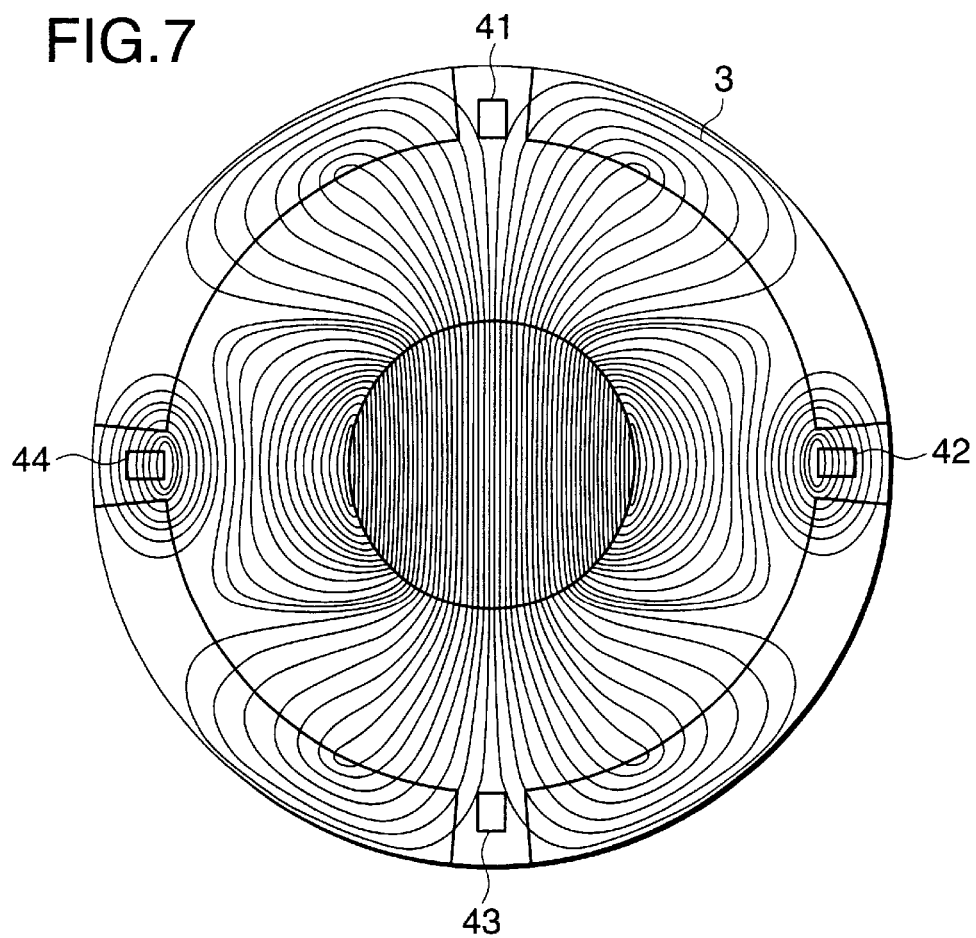
FIG. 7 is an illustration showing a distribution of the magnetic field of the permanent magnet of the second example of the present invention.

FIG. 7 is a view showing the distribution of the magnetic flux of the encoder apparatus. The magnetic flux is concentrated on the magnetic substance and passes through it, and the magnetic flux density at the position at which the magnetic field detection element is arranged in the air gap, is larger than that in the air gap portion between the conventional magnet and magnetic substance.

Figure 8:
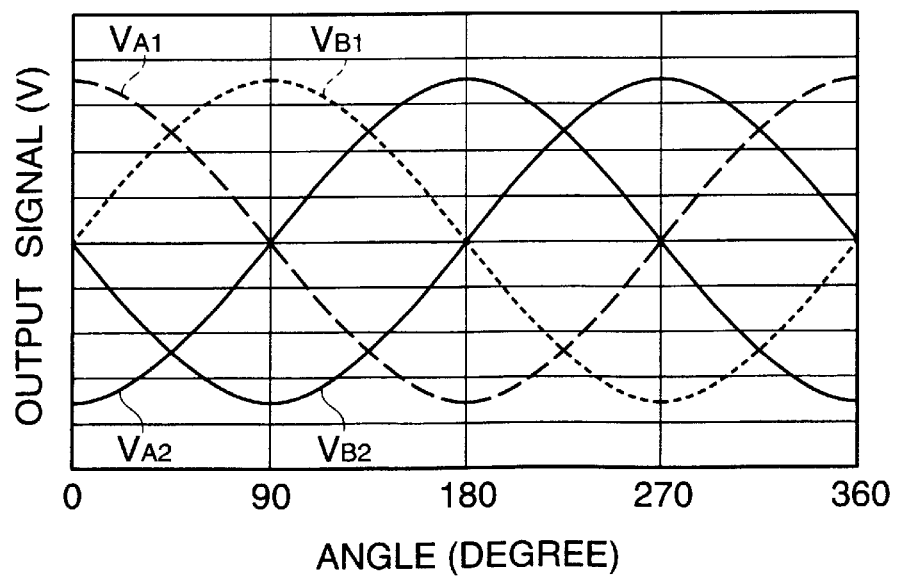
FIG. 8 is an illustration showing an output of each magnetic field detection element of the second example of the present invention.

Operations are the same as those in the first example, and when the rotating body 1 is rotated, the detection element of each phase outputs the signal shown in FIG. 8. FIG. 8 shows output signals of detection elements 41, 42, 43 and 44 of respective phases of A1, B1, A2 and B2. The sinusoidal wave-like magnetic flux density corresponding to the rotation angle position is outputted. The signal output is processed by the signal processing circuit shown in FIG. 2, and the rotation angle is detected. When the absolute position of one rotation is detected, an absolute position signal in which one rotation is divided by 64000, is obtained, and the accuracy is increased to 2 times of the conventional method. Further, because the arrangement space of the magnetic detection elements in the conventional technology is not necessary, thereby, the outer diameter of the magnetic encoder is reduced to ⅔ and the size can be reduced.

As described above, in the present example, the following effects can be obtained:

(1) Because the magnetic substance is not continuous and has an air gap, the magnetic resistance of the magnetic substance becomes large, and is not magnetically saturated, thereby, an accurate sinusoidal wave signal can be obtained.

(2) Because the magnetic flux from the magnet which is the magnetic substance, is concentrated on the magnetic substance and passes through it, even when the disturbance of the magnetic flux exists, the disturbance is moderated. Because the averaged magnetic flux is detected, the influence of an error of the shape of the magnet or an error of arrangement of the magnet are hardly affected. Accordingly, the manufacturing cost is low, and the assembling is easy.

(3) Because the magnetic detection element arrangement space in the conventional technology is not necessary, the gap distance to the magnetic substance can be reduced, and the size of the encoder can be more reduced.

(4) Because the magnetic flux density at the position at which the magnetic field detection elements are arranged is larger than that in the air gap between the conventional magnet and magnetic substance, the detection signal is greater.

(5) Therefore, the outer diameter of the magnet can be further reduced. Further, the distance between the magnet and the magnetic substance can be reduced, thereby, the size of the encoder can be further reduced.

(6) Even when a low cost magnet whose energy product is small is used, because a sufficient detection signal can be obtained, thereby, the low cost encoder can be obtained.

THE THIRD EXAMPLE

Figure 9A:
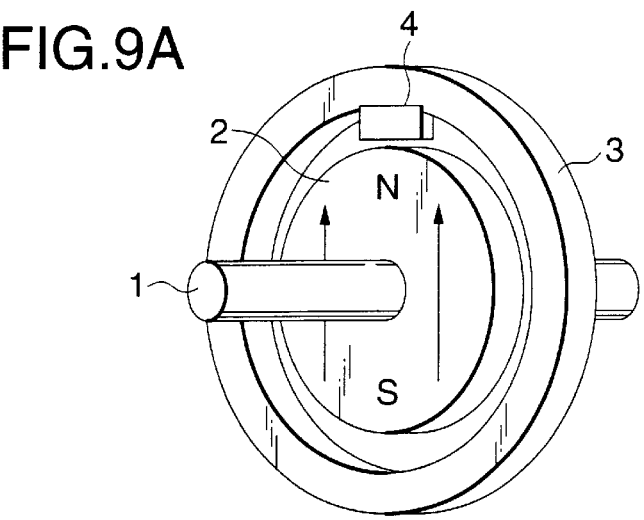
FIGS. 9A and 9B are views showing a magnetic encoder apparatus of the third example of the present invention.
Figure 9B:
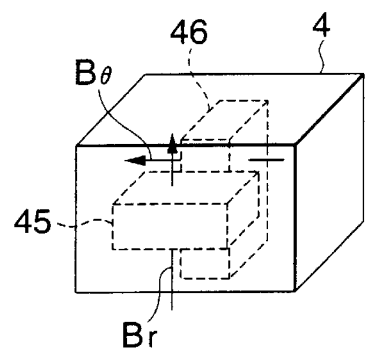

FIG. 9 is a view showing the overall structure of the magnetic encoder apparatus showing the third example, and FIG. 9A is a perspective view, and FIG. 9B is an enlarged perspective view of the magnetic field detection element. The present embodiment is structured such that one magnetic field detection element simultaneously detects the magnetic field of the circumferential direction and radial direction.

The permanent magnet 2 is the same as that in the first example, and the linearly anisotropic magnet is used. That is, the material is formed of ferrite magnet, Sm—Co series magnet, Nd—Fe—B series magnet, or distributed composite magnet in which each kind of the magnets are combined with each other by the high polymer material, and is magnetized in the one direction in parallel to the vertical direction to the rotation shaft of the rotating body 1. The fixed body 3 is formed of ring-shaped nonmagnetic material stainless steel. As the fixed body 3, the magnetic substance may be used. The magnetic field detection element 4 is fixed so as to oppose to the permanent magnet 2 through the air gap inside the fixed body 3, and as shown in FIG. 9B, houses therein a radial direction magnetic sensing portion 45 to detect the magnetic flux density Br of the magnetic field of the radial direction and a circumferential direction magnetic sensing portion 46 to detect the magnetic flux density Bθ of the magnetic field of the circumferential direction.

Figure 10:
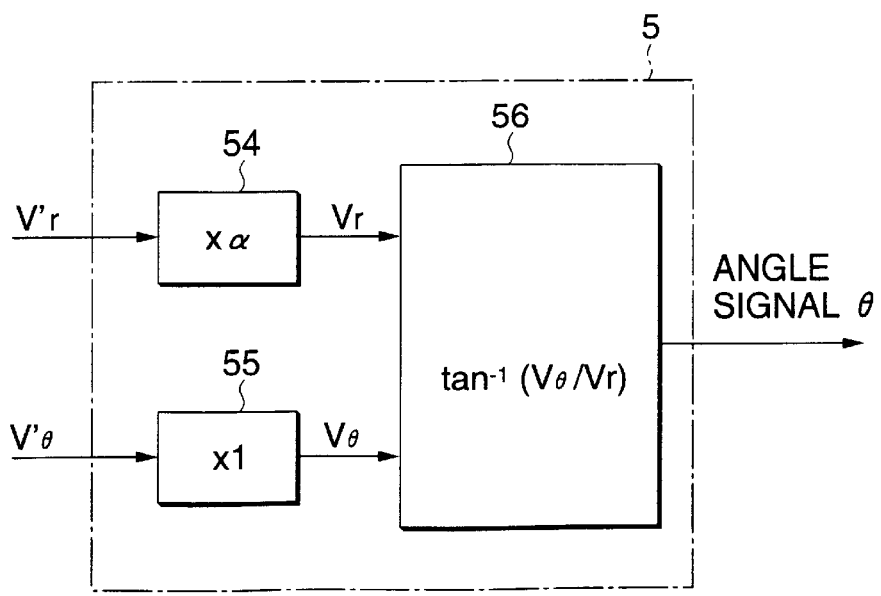
FIG. 10 is a block diagram showing a signal processing circuit of the third example of the present invention.

The signal processing circuit 5 processes an output Vr corresponding to the signal of the magnetic flux density Br of the magnetic field of the radial direction outputted from the magnetic field detection element 4, and an output Vθ corresponding to the signal of the magnetic flux density Bθ of the magnetic field. The signal processing circuit 5 is provided with, as shown in FIG. 10, an angle calculation circuit 51 by which arctan (Vθ/Vr) is calculated from the signals Vr and Vθ, and a rotation angle is calculated considering about the positive and negative of Vr and Vθ.

Figure 11:
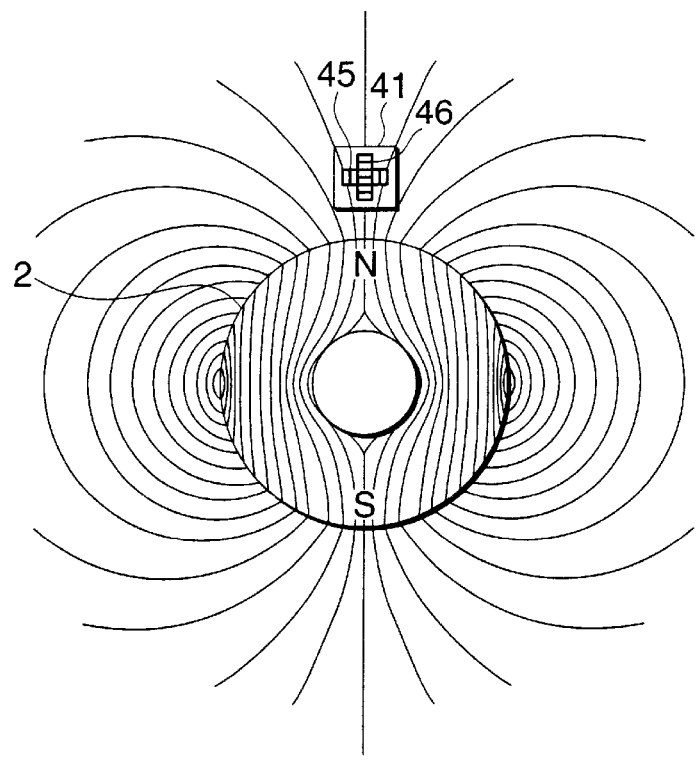
FIG. 11 is an illustration showing a distribution of the magnetic field of a permanent magnet of the third example of the present invention.
Figure 12:
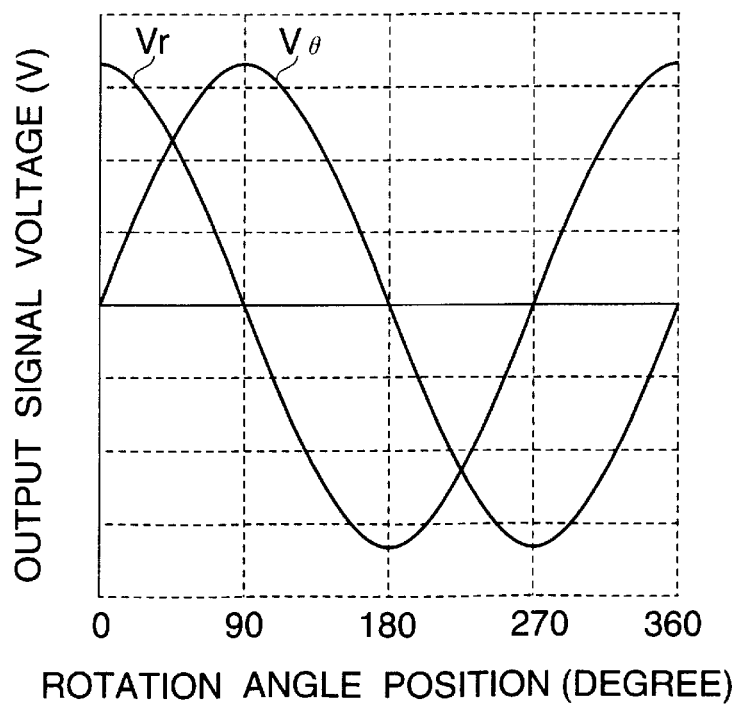
FIG. 12 is an illustration showing an output of the signal processing circuit of the third example of the present invention.
Figure 13:
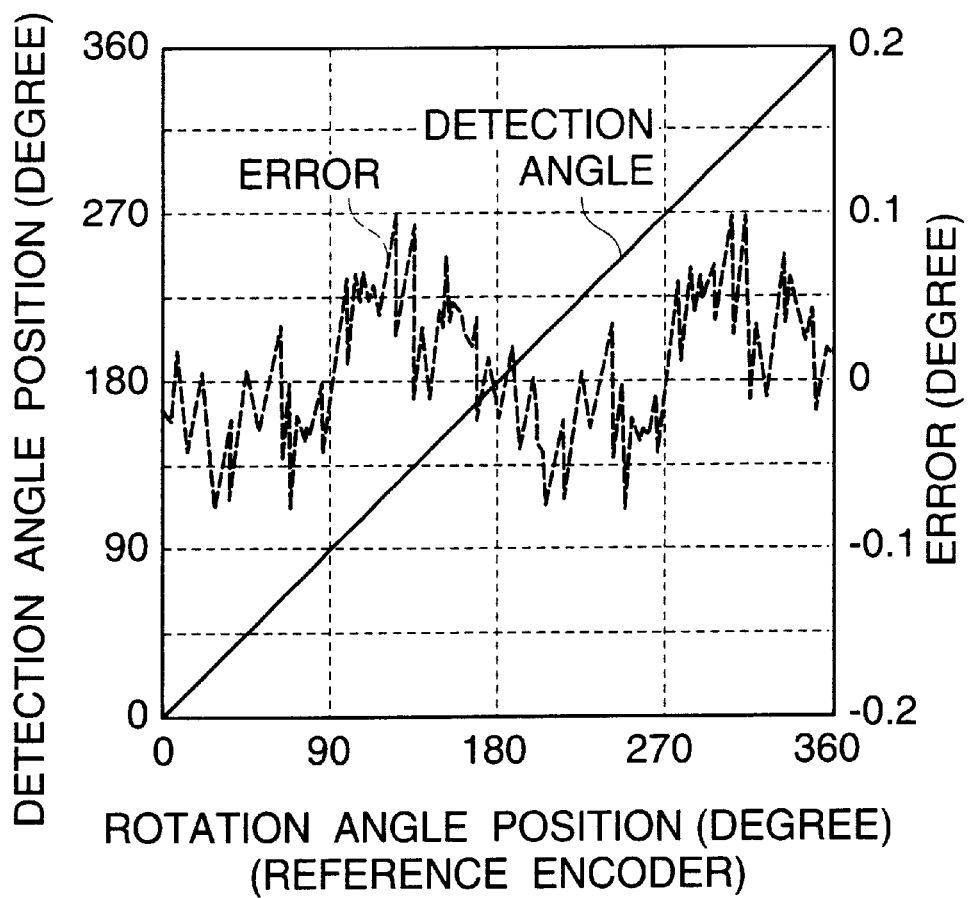
FIG. 13 is an illustration showing the accuracy of a rotation angle of the third example of the present invention.
Figure 14:
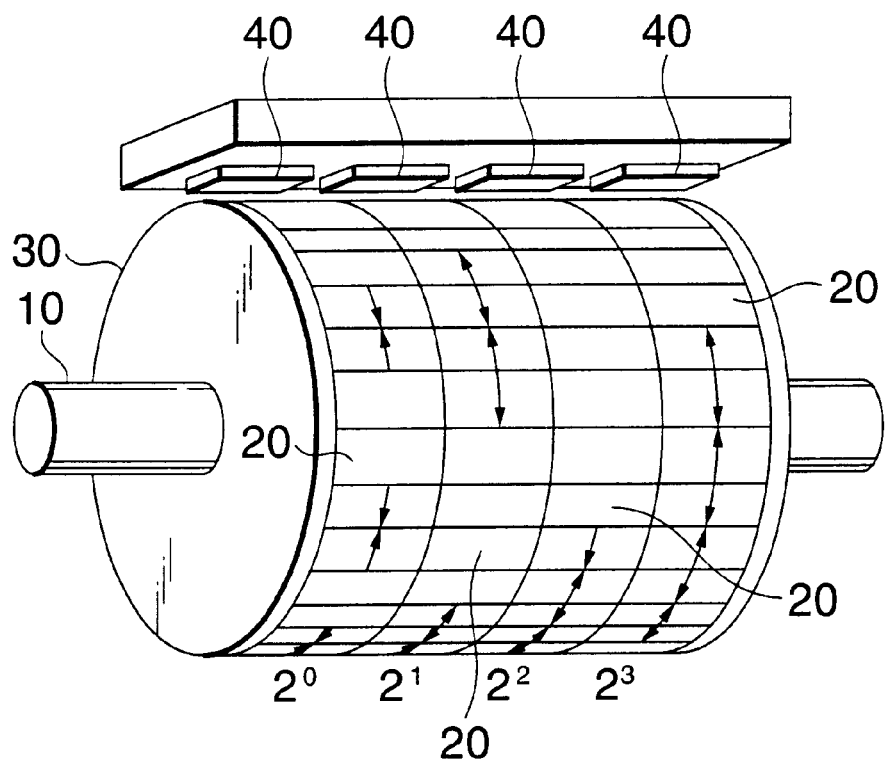
FIG. 14 is a perspective view showing the conventional magnetic encoder apparatus.
Figure 15:
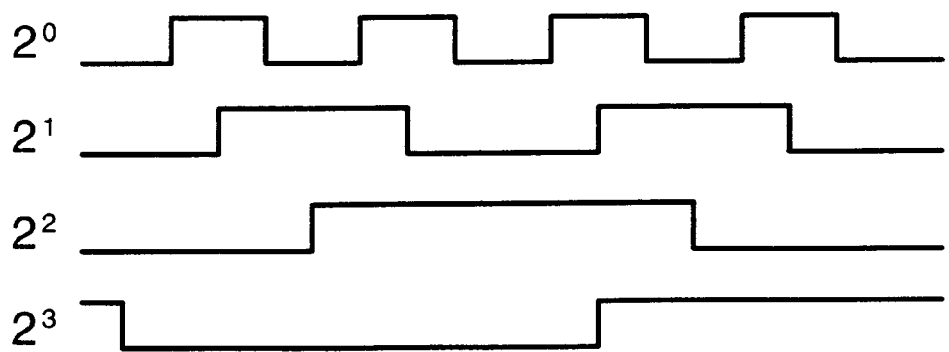
FIG. 15 is an illustration showing a waveform of the detection output of the conventional magnetic encoder apparatus.

According to such the structure, the magnetic field as shown in FIG. 11 is formed from the permanent magnet 2, and by the magnetic field detection element 4, the magnetic flux density Br and Bθ of the radial direction and the circumferential direction is detected. When the rotating body 1 is rotated once, the magnetic field detection element 4 detects the sinusoidal wave-like magnetic flux density Br and Bθ corresponding to a rotation angle position as shown in FIG. 12, and the outputs Vr and Vθ corresponding to the sinusoidal wave-like magnetic flux density Br and Bθ are inputted into the signal processing circuit 5.

Herein, as shown in FIG. 9B, because there is a slight difference in the detection sensitivity and the arrangement position of the radial direction magnetic sensing portion 45 and circumferential direction magnetic sensing portion 46 of the magnetic field detection element 4, the amplitude values of the outputs V'θ and V'r are slightly different from each other. When the amplitude ratio is α, α=(V'θ/V'r). Accordingly, in order to make the amplitude of both outputs equal, Vr=α×V'r, Vθ=V'θ. From this, the rotation angle θ is obtained by the following equation.

$$\theta = \arctan(V\theta/Vr)$$

Incidentally, amplifiers 54 and 55 shown in FIG. 10 are provided in the signal processing circuit 5, a gain of the amplifier 54 is adjusted corresponding to the amplitude ratio α and the output Vr is obtained from the output V'r, and Vr is inputted into the angle calculation circuit 56 and the angle signal θ is obtained.

According to such the structure, even when the rotating body 1 is eccentrically rotated, because the rotation angle θ is not a function of the distance r between the center of the magnet and the magnetic field detection element, the rotation position can be accurately obtained.

Further, even when the temperature distribution inside the magnetic encoder is different depending on the position, the radial direction magnetic sensing portion 45 and the circumferential direction magnetic sensing portion 46 are located at almost the same position, there is no difference in the temperature characteristics of the magnetic field detection element 4, and there is no influence of the temperature distribution in the rotation angle θ.

For example, the magnetic field detection element 4 composed of the Hall effect element is arranged on the outer periphery of the permanent magnet 2 of the 3 mm diameter and 1 mm thickness, and the absolute position signal of one rotation is detected.

FIG. 12 shows the relationship between the rotation angle of the high accurate reference encoder (resolution $10^6$ pulses/rotation) and the detection angle, and the detection error.

According to this, it is found that the maximum error between the reference encoder and the magnetic encoder of the present invention is not larger than 0.1°.

According to this, 360°/0.1°=3600, and one rotation can be divided by 3600. Accordingly, the absolute position signal showing the very high resolution in which one rotation is divided by 3600, can be obtained.

In the above example, an example in which the Hall effect element is used as the magnetic field detection element, is explained, however, when the magnetic resistance element is used, the same effect can also be obtained.

Further, when the permanent magnet is structured by a linearly anisotropic magnet which can be easily magnetized in one direction, the high magnetic flux density can be obtained, and the detection accuracy can be increased.

As described above, in the present example, the following effects are obtained.

(1) Even when the circuit is structured such that the differential signal can be obtained considering that the rotating body is eccentrically rotated, the number of magnetic field detection elements is not increased, and the cost is low.

(2) Because it is not necessary that each magnetic field detection element is accurately arranged so that the phase difference of 90° or 180° can be accurately obtained, the assembling and adjusting can be easily carried out in a short period of time.

(3) Even when the temperature distribution is different inside the magnetic encoder, because the magnetic field detection element is one, no error is produced in the characteristics, thereby, the detection accuracy of the rotation position is increased.

INDUSTRIAL APPLICABILITY

The present invention is appropriate for a magnetic encoder which has the simple structure, very high resolution, high accuracy and small size. Further, because the influence of the temperature distribution and the influence of the production error are hardly affected, the reliability is high, and the present invention is appropriate for a magnetic encoder apparatus whose cost is low.

What is claimed is:

1. A magnetic encoder apparatus, comprising:
   a disk-like permanent magnet fixed to a rotating body;
   a magnetic field detection element which is arranged on the outer peripheral side of the permanent magnet and opposed thereto through an air gap and which is attached to a fixed body; and
   a signal processing circuit to process a signal from the magnetic field detection element, wherein the permanent magnet is magnetized in one direction which is perpendicular to a shaft of the rotating body, and the fixed body is formed of a ring-like magnetic substance.

2. The magnetic encoder apparatus according to claim 1, which is characterized in that the fixed body has an air gap in the circumferential direction and the magnetic field detection element is provided in the air gap.

3. The magnetic encoder apparatus according to any one of claims 1 and 2, wherein the magnetic field detection element comprises two pairs of 2 magnetic field detection elements provided at positions whose phases are shifted by 180° from each other, in which each pair of 2 magnetic field detection elements is formed such that their phases are different from each other by 90° and wherein the signal processing circuit is provided with a differential amplifier to process differential signals from the magnetic field detection elements which are opposed to each other, such that the absolute value of a position of the rotating body is detected.

4. The magnetic encoder apparatus according to claim 1, which is characterized in that the magnetic field detection element comprises a radial magnetic sensing portion to detect a magnetic field radial to the axis of the rotating body and a circumferential magnetic sensing portion to detect a magnetic field circumferential to the axis of the rotating body, the radial magnetic sensing portion and the circumferential magnetic sensing portion being proximally arranged.

5. The magnetic encoder apparatus according to any one of the claims 1, 2 and 4, which is characterized in that the magnetic field detection element comprises a Hall effect element or a magnetic resistance element.

6. The magnetic encoder apparatus according to any one of claims 1, 2 and 4, which is characterized in that the permanent magnet is formed of any one of a ferritic magnet, Sm—Co series magnet, Nd—Fe—B series magnet, or distributed composite magnet in which the various kinds of magnets are combined with each other by a high polymer material.

7. The magnetic encoder apparatus according to any one of claims 1, 2 and 4, which is characterized in that the permanent magnet has a linear anisotropy.

* * * * *